Feb. 13, 1934.  J. Y. BLAZEK  1,947,378
LATHE ATTACHMENT
Filed Feb. 25, 1932  2 Sheets-Sheet 1

Inventor
John Y Blazek
By Hull Brock&West
Attorney

Feb. 13, 1934.   J. Y. BLAZEK   1,947,378
LATHE ATTACHMENT
Filed Feb. 25, 1932   2 Sheets-Sheet 2

Inventor
John Y. Blazek
By Hull Brock and West
Attorney

Patented Feb. 13, 1934

1,947,378

UNITED STATES PATENT OFFICE 1,947,378

LATHE ATTACHMENT

John Y. Blazek, Cleveland, Ohio, assignor to Lempco Products, Inc., Bedford, Ohio, a corporation of Ohio Application February 25, 1932. Serial No. 594,979

4 Claims. (Cl. 82—40)

This invention relates to a lathe and especially to a means for connecting an attachment to a lathe of the type usually employed for truing brake drums and designed to enable the use of such lathe for cutting teeth from a flywheel or similar purpose. A further object is the provision of a special attachment for carrying out the above mentioned purpose. A more limited object is to provide a novel means for securing and centering an arbor with respect to the lathe spindle.

Figure 1:
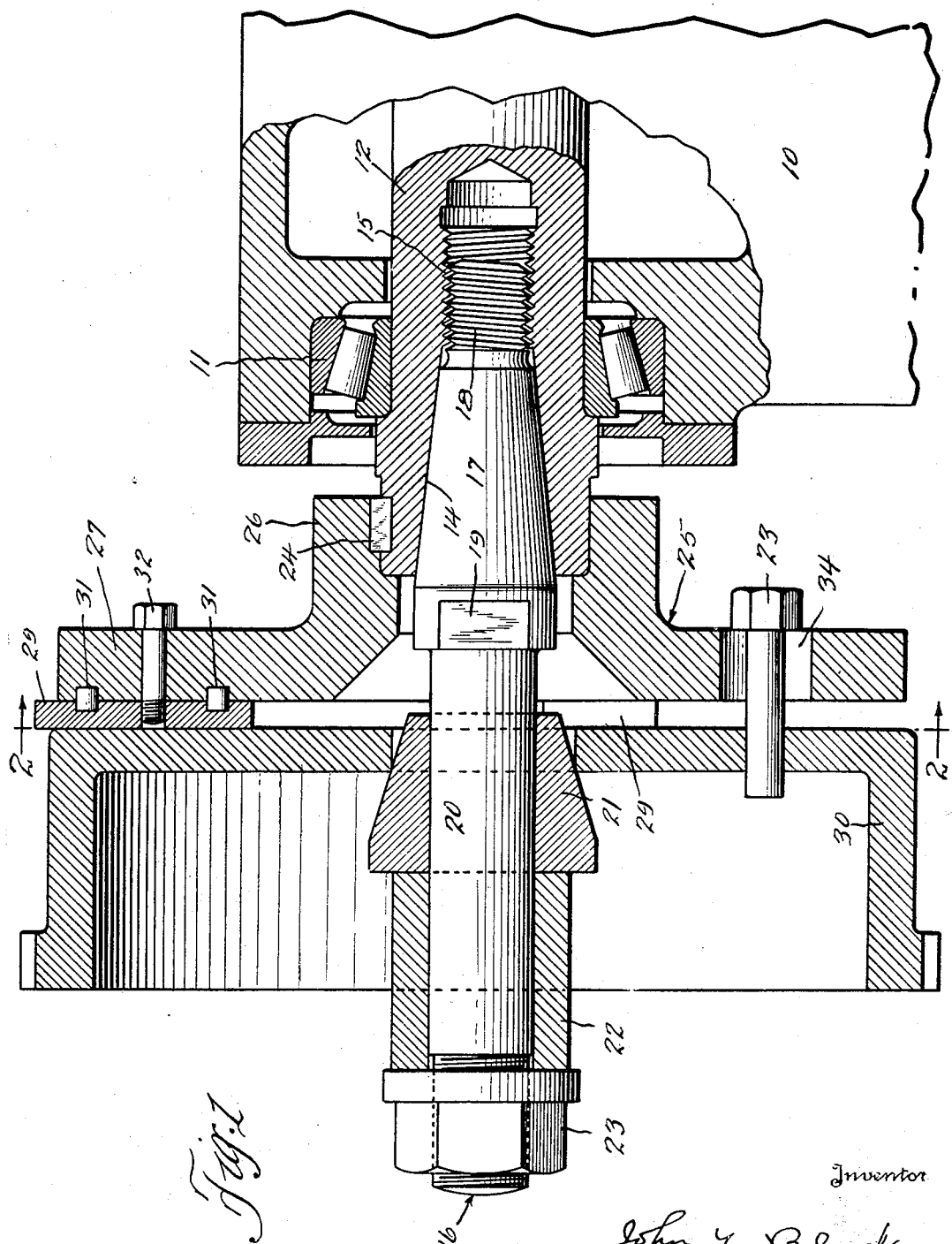
Figure 2:
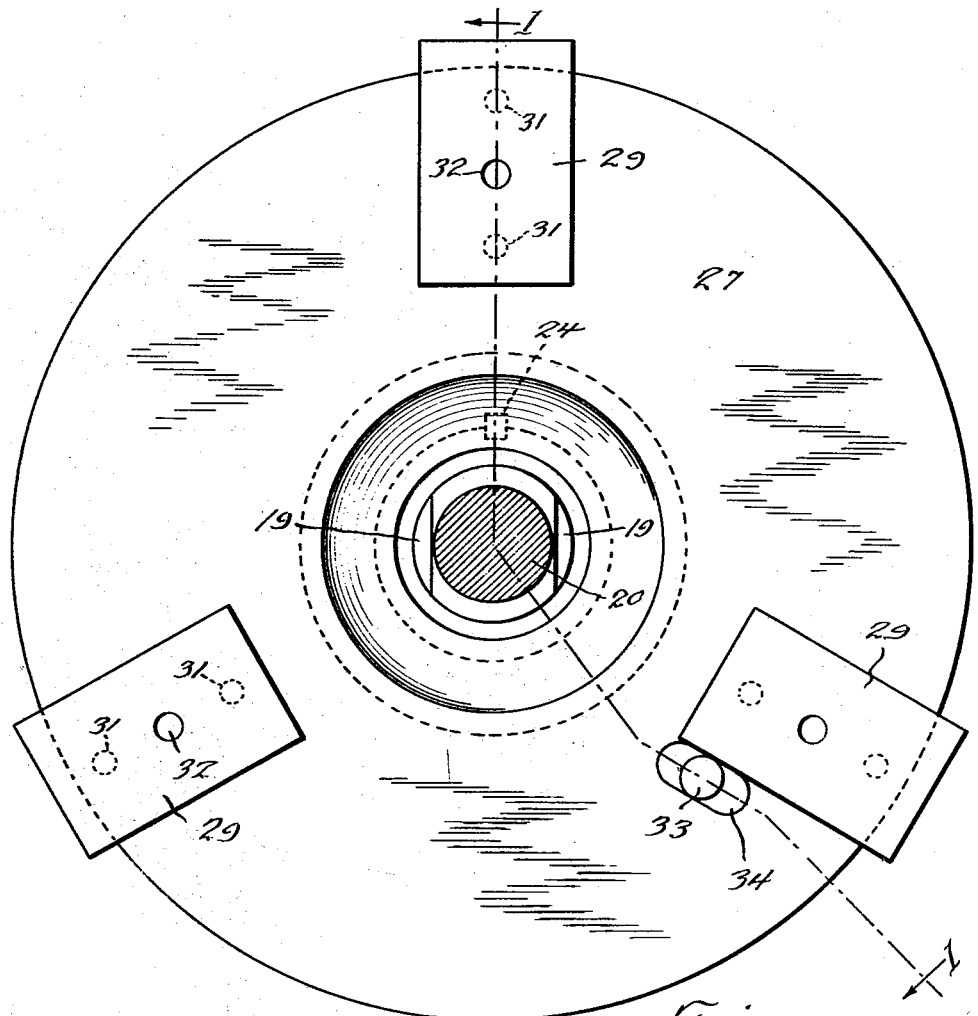
Figure 3:
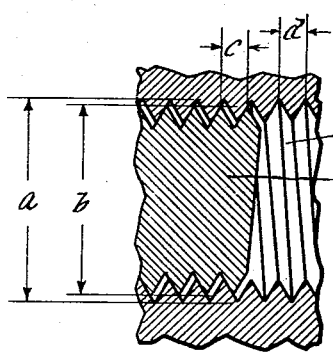

I attain the foregoing and other and more limited objects in and through the mechanism hereinafter described and claimed and illustrated in the accompanying drawings in which Fig. 1 is a fragmentary longitudinal section corresponding substantially to the line 1—1 of Fig. 2; Fig. 2 is a section on the line 2—2 of Fig. 1; and Fig. 3 is an enlarged detail section showing the relative sizes of the cooperating threaded portions on the rotating lathe portion and the spindle which is connected thereto.

Referring now to the drawings, the reference numeral 10 refers generally to a lathe body in which is rotatably mounted as in bearings 11 a rotating driving member or spindle 12. The member 12 will be driven by a suitable connection with the prime mover (not shown) and will project from the lathe body 10. A suitable plate 13 may be provided for holding suitable packing (not shown) for preventing the escape of lubricant from the bearing 11. The member 12 is provided with a conical opening 14 terminating in a threaded portion 15. An arbor 16 is provided with a corresponding conical portion 17 adapted to be received within the conical opening 14 in the member 12 whereby to center itself and be coaxial with the member 12. The arbor 16 terminates in a threaded portion 18 adapted to be received within the threaded portion 15 of the member 12. Flats 19 are provided on the arbor 16 for the purpose of receiving a tool for tightening the arbor with respect to the driving member 12. The arbor 16 may as respects its remaining structure take various forms in accordance with the purpose for which it is designed.

In the present construction for the removal of teeth from the fly wheel prior to banding, the remaining portion of the arbor takes the form of an extension 20 terminating in a threaded portion and adapted to receive the cone 21, a sleeve 22 and a nut 23. In the present construction the member 12 is provided with a keyway adapted to receive a key 24 for the purpose of preventing rotation of a face plate 25 which is received thereon. As is clear from the drawing, the face plate 25 includes a hub portion 26 and a flange portion 27, the hub engaging the member 12 and supporting the face plate while the flange carries blocks 29 for the purpose of locating the bearing pressure of the face plate at or near the periphery of the flywheel 30. The blocks 29 are secured with respect to the face plate by means of small pins 31 extending into said blocks and said face plate and securing studs 32. The pins 31 are very tightly fitted whereas the bolt 32 has a very slight clearance. In this way the shear is taken by the pins while the stud 32 merely serves the purpose of holding the blocks 29 against the face plate. The pins 31 may if desired be slightly tapered from the middle toward the ends for the purpose of more easily securing the desired tightness, and a series of openings may be provided in the plate 25 for adjusting the position of the blocks 29.

In order to prevent slipping between the face plate and flywheel, a pin 33 is inserted through a slot 34 into one of the securing openings in the flywheel 30. This pin is, as clearly seen from Fig. 2, placed adjacent one of the blocks 29 whereby to be in shear. Inasmuch as flywheels differ in size and in the positioning of the securing openings, a slot 34 is provided instead of an opening which might fail to register in case of a particular flywheel.

In order that the threaded connection between the arbor 16 and the member 12 may not bind and prevent accurate centering, the threaded extremity of the arbor is slightly undersize with respect to the threaded opening 15 which receives it. This is brought out very clearly in Fig. 3 where the distance $a$ is greater than the distance $b$ by an amount found to be the minimum tolerance required. The pitch of the threads, however, is the same, as indicated in the drawings, the distances $c$ and $d$ being equal. By the use of this construction, it is possible to center the arbor 16 perfectly without binding of the threads whereby the axes of the arbor 16 and the member 12 are the same.

While I have shown and described the preferred embodiment of my invention I wish it understood that the same is not limited to details thereof except in accordance with the scope of the appended claims.

Having thus described my invention, what I claim is:

1. In a device of the character described, a spindle, a bore extending into said spindle a short distance, an arbor detachably secured in said bore, a face plate non-rotatably mounted on said spindle independently of said arbor and carrying thin blocks positioned flat thereagainst and adapted to engage a flywheel, means for centering said flywheel with respect to said arbor and face plate and urging it against the blocks, and means for preventing rotation of the flywheel with respect to said face plate.

2. In a device of the character described, a spindle, an arbor detachably secured thereto, a face plate non-rotatably mounted on said spindle and carrying blocks fixed to the plane surface thereof remote from said spindle and adapted to engage a flywheel, means for centering said flywheel with respect to said arbor and face plate and urging it against the blocks, and means for preventing rotation of the flywheel with respect to said face plate said last means comprising a slot formed in said flywheel with one edge extending along an edge of one of said blocks and a pin adapted to pass through said flywheel and contact said block in any position along said slot.

3. In a device of the character described, a spindle, a bore extending into said spindle a short distance only and having a tapered shoulder and a threaded portion; an arbor having a conical portion and a threaded tip detachably secured thereto in said bore, a face plate non-rotatably mounted on said spindle and carrying blocks adapted to engage a flywheel, means for centering said flywheel with respect to said arbor and face plate and urging it against the blocks, and means for preventing rotation of the flywheel with respect to said face plate, said last means including a slot in said face plate adjacent one of said blocks, and a pin extending through said slot and into an opening in said flywheel and engaging against a block.

4. In a device of the class described, a spindle member, an arbor member adapted to be connected thereto, one of said members having formed therein an opening having a conical portion and a threaded portion, the other member having a conical portion adapted to fit into the said conical portion and a threaded portion adapted to cooperate with the said threaded portion for urging said conical portions into tight engagement for accurately aligning said members, said second mentioned threaded portion being of a substantially smaller diameter than said first mentioned threaded portion.

JOHN Y. BLAZEK.